US011662727B2

(12) United States Patent
Fang et al.

(10) Patent No.: US 11,662,727 B2
(45) Date of Patent: May 30, 2023

(54) WIDE-AREA MOTION IMAGING SYSTEMS AND METHODS

(71) Applicant: Massachusetts Institute of Technology, Cambridge, MA (US)

(72) Inventors: Cindy Y. Fang, Arlington, MA (US); William D. Ross, Westford, MA (US); Lauren L. White, Carlisle, MA (US); Joseph Bari, Concord, MA (US); William Cason, Tewksbury, MA (US); Donald Johnson, Woburn, MA (US); Christopher Bowen, Somerville, MA (US); Kyle Bojanowski, Arlington, VA (US); Victoria Dye, Allentown, PA (US)

(73) Assignee: Massachusetts Institute of Technology, Cambridge, MA (US)

( * ) Notice: Subject to any disclaimer, the term of this patent is extended or adjusted under 35 U.S.C. 154(b) by 323 days.

(21) Appl. No.: 16/987,583

(22) Filed: Aug. 7, 2020

(65) Prior Publication Data
US 2021/0101678 A1 Apr. 8, 2021

Related U.S. Application Data

(60) Provisional application No. 62/912,201, filed on Oct. 8, 2019.

(51) Int. Cl.
| G05D 1/00 | (2006.01) |
| B64C 39/02 | (2023.01) |
| G06V 20/50 | (2022.01) |
| G06V 20/52 | (2022.01) |
| G06T 7/20 | (2017.01) |

(Continued)

(52) U.S. Cl.
CPC ........ *G05D 1/0094* (2013.01); *B64C 39/022* (2013.01); *B64C 39/024* (2013.01);
(Continued)

(58) Field of Classification Search
CPC ............... B64C 39/024; B64C 39/022; B64C 2201/127; B64C 2201/145;
(Continued)

(56) References Cited

U.S. PATENT DOCUMENTS

| 9,007,432 B2 | 4/2015 | Chuang et al. |
| 9,036,001 B2 | 5/2015 | Chuang et al. |

(Continued)

OTHER PUBLICATIONS

International Search Report and Written Opinion in International Patent Application No. PCT/US2020/045319 dated May 18, 2021, 13 pages.

*Primary Examiner* — Yonel Beaulieu
(74) *Attorney, Agent, or Firm* — Smith Baluch LLP

(57) ABSTRACT

A wide-area motion imaging system provides 360° persistent surveillance with a camera array that is small, lightweight, and operates at low power. The camera array is mounted on a tethered drone, which can hover at heights of up to 400', and includes small imagers fitted with lenses of different fixed focal lengths. The tether provides power, communication, and a data link from the camera array to a ground processing server that receives, processes and stores the imagery. The server also collects absolute and relative position data from a global positioning system (GPS) receiver and an inertial measurement unit (IMU) carried by the drone. The server uses this position data to correct the rolling shutter effect and to stabilize and georectify the final images, which can be stitched together and shown to a user live or in playback via a separate user interface.

24 Claims, 12 Drawing Sheets

(51) Int. Cl.
   *G06V 20/13* (2022.01)
   *G06T 7/207* (2017.01)
   *G06T 3/40* (2006.01)
   *B64U 101/30* (2023.01)

(52) U.S. Cl.
   CPC .......... *G06T 3/4015* (2013.01); *G06T 7/207* (2017.01); *G06V 20/52* (2022.01); *B64U 2101/30* (2023.01); *B64U 2201/104* (2023.01); *B64U 2201/202* (2023.01); *G06V 20/13* (2022.01)

(58) Field of Classification Search
   CPC .......... B64C 2201/148; B64C 39/02; G05D 1/0094; G05D 1/101; G05D 1/00; G06T 3/4015; G06T 7/207; G06T 7/00; G06T 3/00; G06V 20/13; G06V 20/52; G06V 20/00
   See application file for complete search history.

(56) References Cited

U.S. PATENT DOCUMENTS

| | | |
|---|---|---|
| 9,749,526 B2 | 8/2017 | Chuang et al. |
| 9,792,709 B1 | 10/2017 | Meler |
| 9,973,696 B1 | 5/2018 | Meler et al. |
| 10,033,928 B1 | 7/2018 | Meler |
| 10,079,975 B2 | 9/2018 | Berberian |
| 10,178,316 B2 | 1/2019 | Shamir et al. |
| 10,306,186 B2 | 5/2019 | Chuang et al. |
| 10,477,064 B2 | 11/2019 | Douady-Pleven et al. |
| 10,498,958 B2 | 12/2019 | Meler et al. |
| 10,498,966 B2 | 12/2019 | Wheeler et al. |
| 10,560,633 B2 | 2/2020 | Meler |
| 10,630,899 B2 | 4/2020 | Chuang et al. |
| 2015/0271453 A1 | 9/2015 | Chuang et al. |
| 2016/0159472 A1 | 6/2016 | Chan et al. |
| 2016/0313435 A1 | 10/2016 | Smitherman |
| 2017/0134963 A1 | 5/2017 | Priest |
| 2017/0208251 A1 | 7/2017 | Shamir et al. |
| 2018/0002010 A1* | 1/2018 | Bauer ................. G08G 5/0065 |
| 2018/0050800 A1* | 2/2018 | Boykin .................. G10L 25/51 |
| 2018/0109767 A1 | 4/2018 | Li et al. |
| 2018/0352988 A1* | 12/2018 | Ortiz ...................... A47G 29/20 |
| 2019/0238800 A1 | 8/2019 | Chuang et al. |
| 2020/0084338 A1 | 3/2020 | Douady-Pleven et al. |
| 2020/0398999 A1* | 12/2020 | Ortiz ...................... G08B 13/06 |
| 2021/0302621 A1* | 9/2021 | Brown ...................... G06F 3/14 |
| 2022/0006962 A1* | 1/2022 | Bathija ................ G05D 1/0094 |

\* cited by examiner

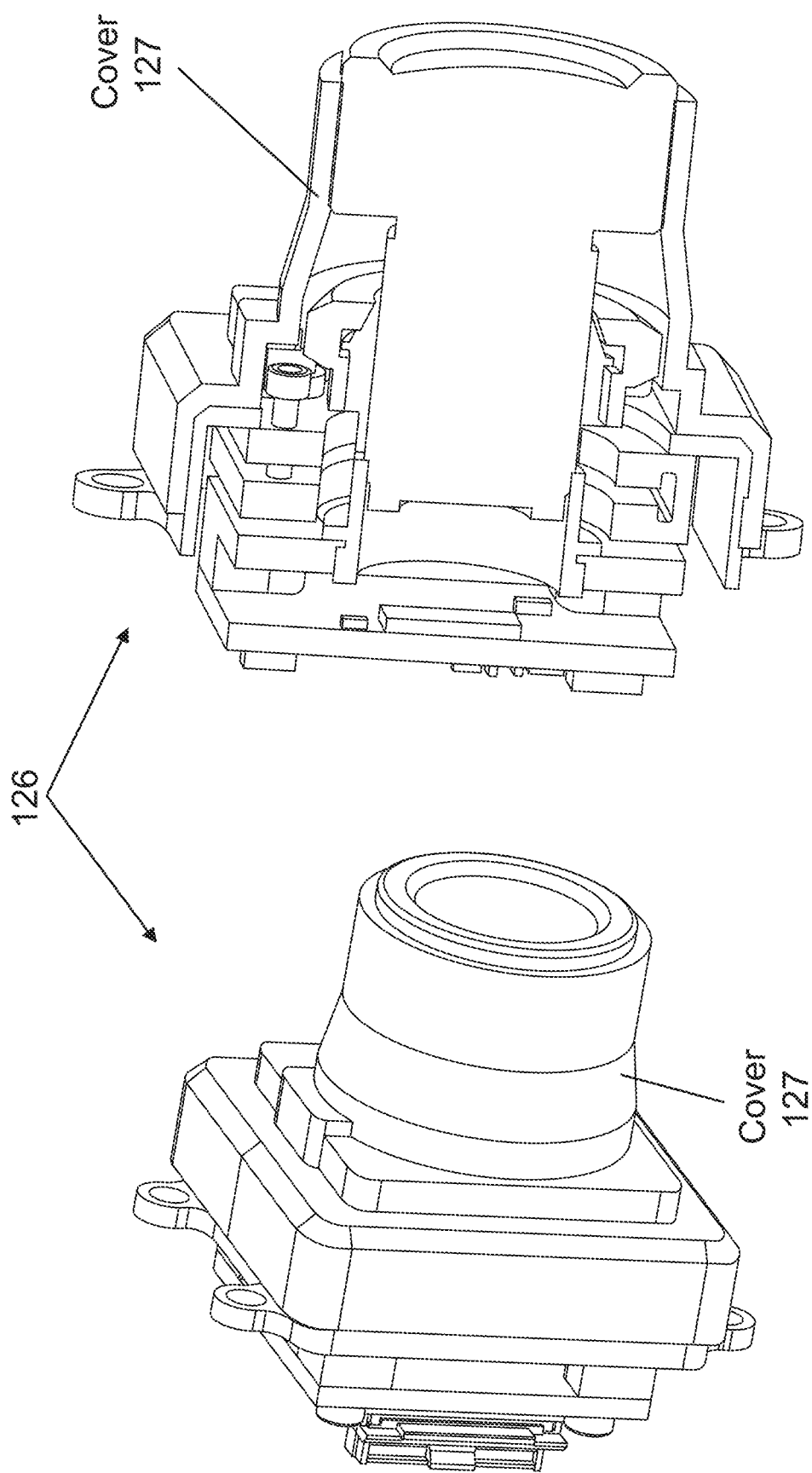

WIDE-AREA MOTION IMAGING SYSTEMS AND METHODS

CROSS-REFERENCE TO RELATED APPLICATION(S)

This application claims the priority benefit, under 35 U.S.C. 119(e), of U.S. Application No. 62/912,201, filed on Oct. 8, 2019, which is incorporated herein by reference in its entirety.

GOVERNMENT SUPPORT

This invention was made with government support under FA8702-15-D-0001 awarded by the U.S. Air Force. The government has certain rights in the invention.

BACKGROUND

The Immersive Imaging System (IIS) is a video surveillance system that provides 360-degree video surveillance from a single vantage point. It includes two or more arrays of cameras, each of which includes a lens and a detector array, an image processor, and hardware compression boards for capturing motion images at a spatial resolution sufficient to identify a human face out to a radius of up to 200 meters in all directions simultaneously. The IIS can combine motion images from the cameras into a single, continuous image that appears as if it were a from a single lens-imager combination. It can also extract and present sub-regions of the single, continuous image in as separate images. These "virtual camera" features of the IIS mimic the pan/tilt/zoom (PTZ) functionality of conventional video cameras without any moving parts and allow one or more viewers to zoom in, zoom out, or follow particular sections of the scene simultaneously.

An IIS can be mounted on a wall, tower, or fence for supporting security personnel in maintaining situational awareness in an area, aiding operators in real-time decision-making, and providing a comprehensive and high-resolution record of all activity in an area of interest. The IIS has other applications as well, including but not limited to the provision of operational support for facilities operators, and the acquisition of high resolution video coverage for media applications. For example, an IIS could be used for military base protection, port security, border security, airport security, and/or casino security. An IIS could be used at a train or subway station, indoor or outdoor stadium, shopping mall, entertainment venue, theme park, convention center, or refugee center.

For more details on IIS, see U.S. Pat. Nos. 9,007,432 B2 and 9,036,001 B2, each of which is incorporated by reference herein in its entirety.

SUMMARY

Although the IIS offers unprecedented surveillance capabilities, it is too large, too heavy, and consumes too much power to be practical for mobile applications or quick deployments. To remedy this drawback, the inventors have a developed a smaller, lighter, more efficient wide-area motion imaging system, called "DragonFly." This system can be deployed on an unmanned aircraft system (UAS) in a matter of minutes to provide 360° of an area above or below the UAS. It is especially useful for monitoring events, areas, or venues that lack towers, polls, or fences that can support an IIS, such as outdoor concerts or natural disaster sites. Compared to the IIS, the DragonFly has fewer components, less expensive optics, and is simpler to deploy and operate. It can also be moved more quickly and integrated more easily with other systems (e.g., in a matter of minutes or hours).

A DragonFly system for wide-area motion imaging may include an unmanned aerial vehicle (UAV), a camera array attached to the UAV and operably coupled to a processor, and a remote server communicatively coupled to the processor. In operation, the camera array acquires motion images of an area around the UAV. And the remote server stores and processes the motion images acquired by the camera array. The UAV may have a center of mass aligned with a center of mass of the camera array along a vertical centerline of the UAV.

The camera array can acquire the motion images over a 360° horizontal field of view. It may include a first row of cameras, each having a first fixed focal length, and a second row of cameras, each having a second fixed focal length different than the first fixed focal length/The first row of cameras acquires a first portion of the motion images at a first spatial resolution, and the second row of cameras acquires a second portion of the motion images at substantially the first spatial resolution.

The remote server can be communicatively coupled to the remote server via a tether connecting the UAV to the ground. This tether can provide electrical power to the UAV and/or the imaging system. The processor (or optical transceiver coupled to or forming part of the processor) can transduce the motion images into an optical signal and the tether comprises a fiber-optic link configured to convey the optical signal from the processor to the remote server.

The remote server can demosaic and color correct the motion images. It can also detect and/or track an object appearing in the motion images. And it can compress and store the motion images in an archive. The remote server can even to georectify the motion images stored in the archive on demand based on at least one of Global Positioning System (GPS) data or inertial navigation system (INS) data.

The system may also include a Global Navigation Satellite System (GNSS; e.g., the Global Positioning System (GPS)) receiver and/or an inertial navigation system (INS). The remote server can georectify the motion images based on data from the GNSS receiver and/or the INS. The INS may be positioned at a geometric center of the camera array.

Another implementation of the DragonFly system for wide-area motion imaging includes a UAV, a camera array, a GNSS receiver, an inertial measurement unit (IMU), an optical transceiver, and a remote server. The camera array is attached to the UAV and can acquire motion images of an area around the UAV at a rate of about 5 frames per second (fps) to about 15 fps. It includes a first tier of cameras having first fixed focal lengths and a second tier of cameras having second fixed focal lengths different than the first fixed focal lengths. The GNSS receiver is also attached to the UAV and measures an absolute position of the camera array at rate of about 1 Hz to about 4 Hz. The IMU is attached to the UAV and disposed in a geometric center of the camera. It measures a relative position of the camera array at a rate of about 1 Hz to about 500 Hz.

The optical transceiver is attached to the UAV and is operably coupled to camera array. It transmits the motion images, the absolute position, and the relative position via a tether. The optical transceiver can transmit the motion images from the first tier of cameras on a first optical carrier and the motion images from the second tier of cameras on a second optical carrier different from the first optical carrier.

The remote server receives this data from the optical transceiver via the tether. It receives, stores, and processes the motion images and georectifies the motion images based the absolute position and the relative position.

All combinations of the foregoing concepts and additional concepts discussed in greater detail below (provided such concepts are not mutually inconsistent) are part of the inventive subject matter disclosed herein. In particular, all combinations of claimed subject matter appearing at the end of this disclosure are part of the inventive subject matter disclosed herein. The terminology used herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 2C shows a perspective view of a visible imager suitable for use in the camera array of FIG. 2A.

FIG. 2D shows a cutaway view of the visible imager of FIG. 2C depicting the lens and lens boot.

DETAILED DESCRIPTION

Figure 1A:
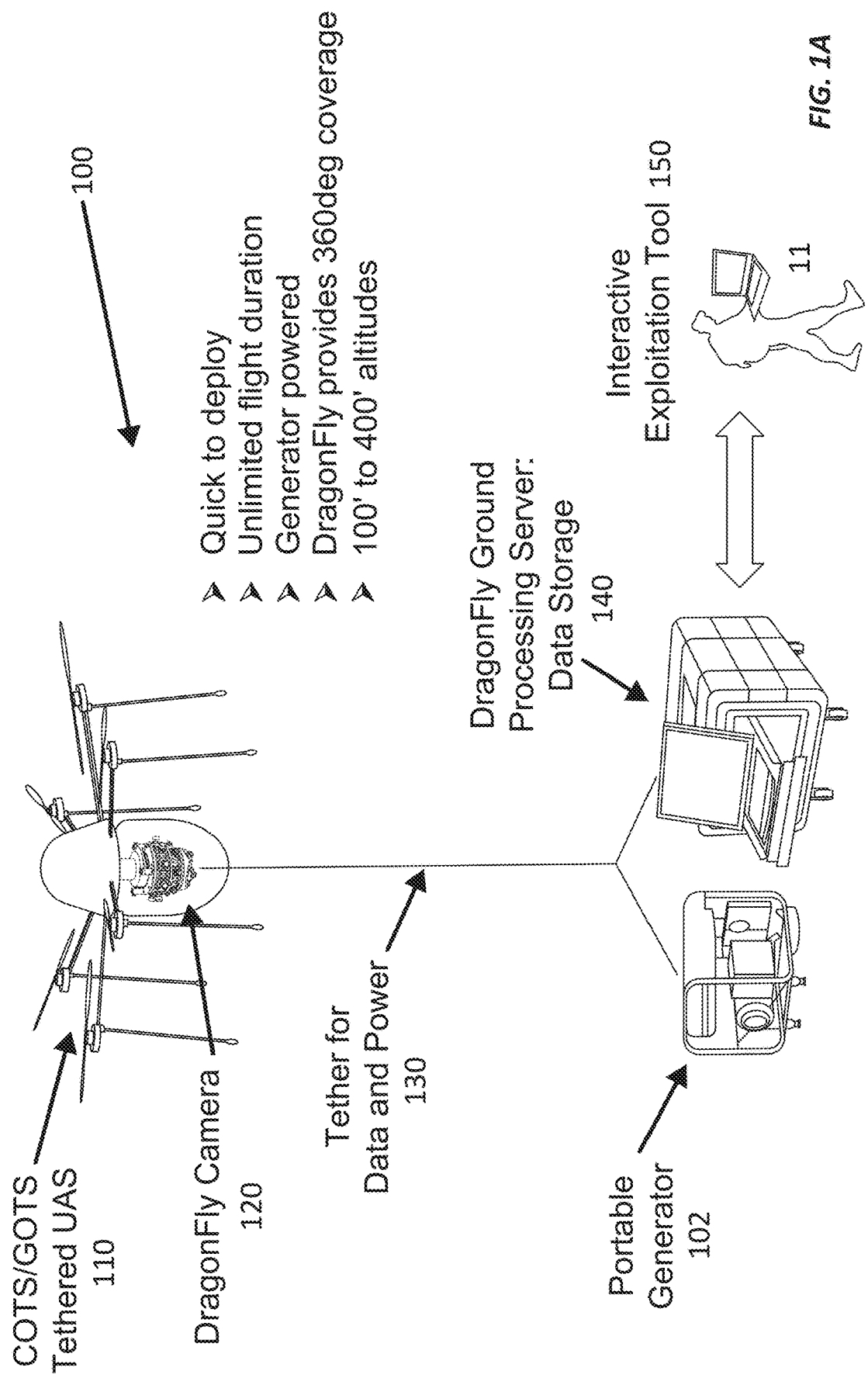
FIG. 1A shows a system for wide-area imaging an area around an unmanned aircraft system (UAS).
Figure 1B:
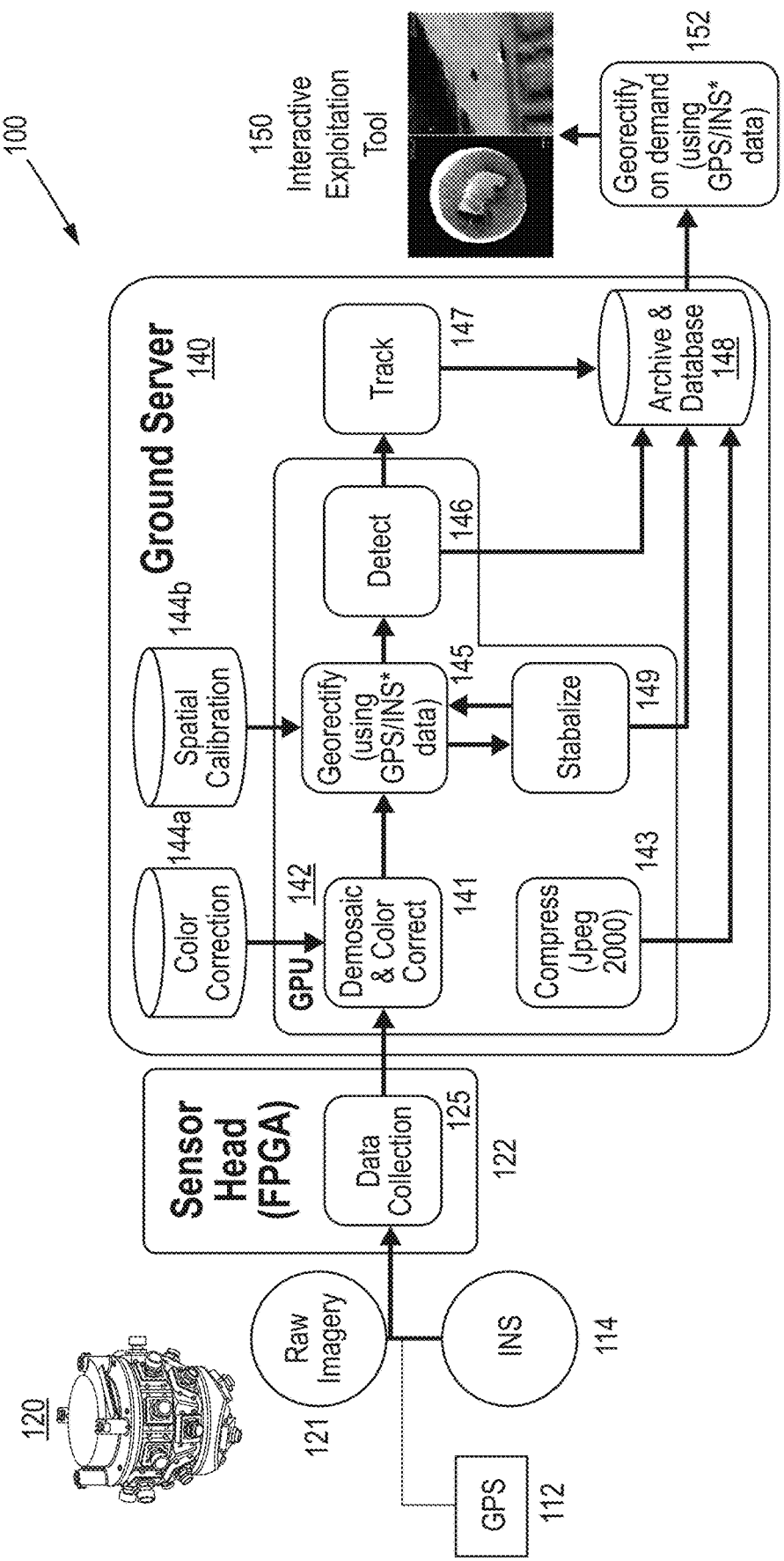
FIG. 1B is a block diagram of the imaging system and remote server in the system for wide-area imaging of FIG. 1A.
Figure 1C:
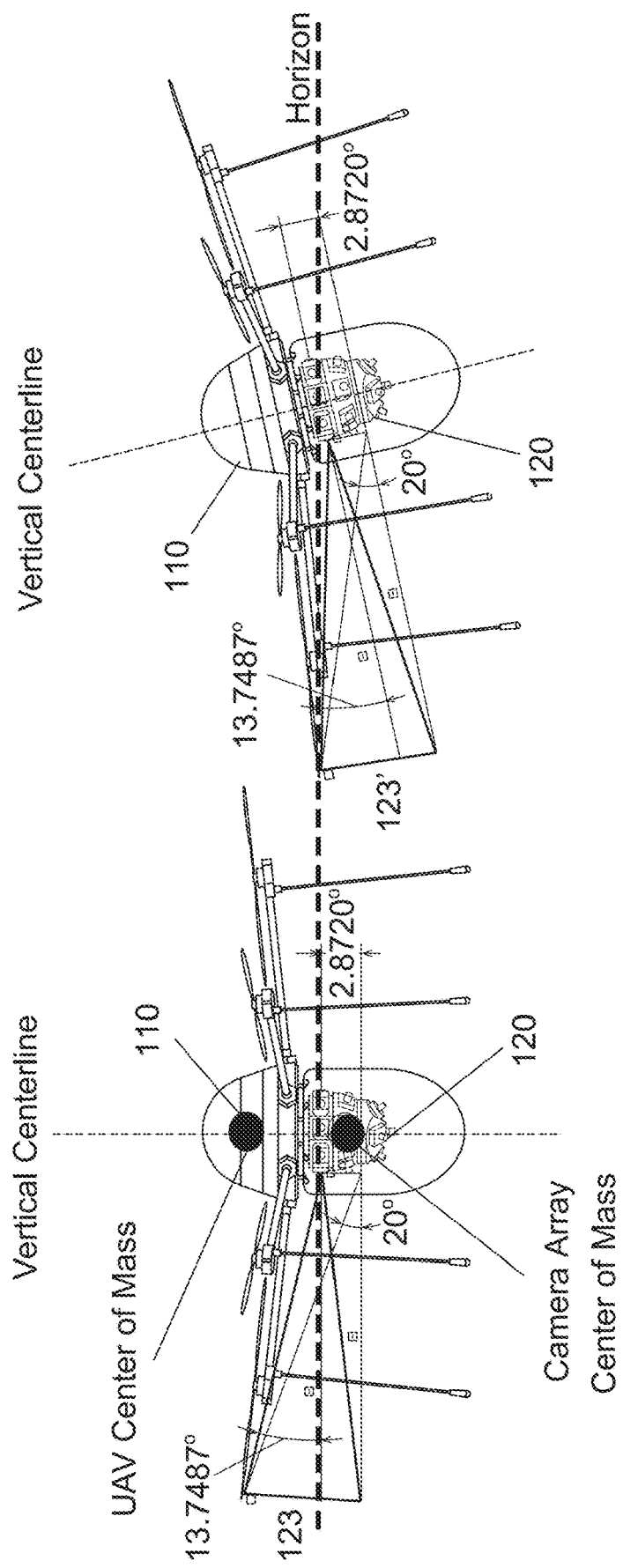
FIG. 1C illustrates changes in the orientation of an imager's field of view caused by changes in the orientation of the UAS.

FIGS. 1A-1C illustrate a wide-area imaging system 100 that can be used for persistent surveillance of a field of view spanning 360°. The system 100 includes a camera array 120 that is suspended from an unmanned aerial vehicle (UAV) 110, which is tethered to a portable generator 102 and a remote server 140 via a tether 130 for data and power. The remote server 140 communicates with the UAS 110 and camera array 120 via the tether 130 and with a user 11 via an interactive exploitation tool 150, such as a specially programmed computer, tablet, or smartphone.

In this example, the UAV 110, also called a drone, is a multi-rotor drone that can hover and fly up, down, and sideways. It can hover for extended periods (e.g., hours or days) at heights of up to 400 feet when powered via the tether 130 by the portable generator 102 or another suitable power source. Other suitable types of UAVs include single-rotor (helicopter), fixed-wing, and vertical takeoff and landing (VTOL) drones. The UAV 110 is a part of an unmanned aircraft system (UAS), which also includes a ground-based controller and a communications link between the UAV 110 and the ground-based controller. Here, the remote server 140 and interactive exploitation tool 150 can be used for ground-based control of the UAV 110, and the tether 130 serves as the communications link to the UAV 110. In other examples, the ground-based controller and communications link for the UAV 110 can be separate from the remote server 140 and the tether 130.

FIG. 1A shows the camera array 120 suspended from the UAV 110 so that it can monitor an area below the UAV 110. The camera array 120 can also be mounted on top of the UAV 110 so that it can monitor an area above the UAV 110. In either case, the camera array 120 can be detachably mounted directly on the UAV 110, on a shock absorber (e.g., a screw-mounted vibration dampener) that is mounted directly to the UAV 110, or on a two- or three-axis gimbal that is mounted directly to the UAV 110. Using a shock absorber or gimbal reduces mechanical vibrations experienced by the camera array 120; that is, it can keep the camera array 120 steadier. This reduces motion- or vibration-induced distortions in the motion images collected by the camera array 120. With or without a shock absorber or gimbal, mounting the camera array 120 on the UAV 110 so that its center of mass is aligned vertically with the UAV's center of mass when the UAV 110 is in its nominal hovering position as shown in FIG. 1C simplifies image processing as explained below.

The wide-area imaging system 100 also includes a processor 122, such as a suitably configured field-programmable gate array (FPGA), a Global Positioning System (GPS) or other Global Navigation Satellite System (GNSS) receiver 112, and an inertial navigation system (INS) or inertial measurement unit (IMU) 114, all of which are shown in FIG. 1B. These devices can be part of the UAV 110, part of the camera array 120, or another payload for the UAV 110. Typically, the processor 122 is part of the camera array 120, and the GPS receiver 112 is mounted on the UAV 110. The INS 114 may be a small, light microelectromechanical systems (MEMS) device that can be mounted on the UAV 110 but is more preferably mounted in or on the camera array 120 to measure orientation and/or relative motion at the geometric center of the camera array 120. The INS 114 can also be displaced from the camera array's geometric center given an accurate measurement of the distance between the INS 114 and the camera array's geometric center, in which case this distance measurement can be used to compensate for the displacement.

FIG. 1B illustrates operation of the wide-area imaging system 100 in greater detail. In operation, the camera array 120 collects raw imagery 121 over the entire area below (or above) the UAV 110. The processor 122 collects the raw imagery 121 as well as data about the system's absolute position from the GPS receiver 112 and data about the camera array's orientation and/or relative position from the INS 114. Typically, the camera array 120 provide imagery at a rate of about 5 frames per second to about 15 frames per second, the GPS receiver 112 provides absolute position data at a rate of about 1 Hz to about 4 Hz, and the INS 114 provides the orientation and/or relative position at a rate of about 1 Hz to about 500 Hz. Ideally, the GPS receiver 112 and INS 114 would provide at least one position measurement per line in the image frame, but the CMOS imagers in the camera array 120 typically have hundreds to thousands of lines (e.g., 2432 lines) per image and operate at frame rates that make this impractical. Instead, the GPS receiver 112 and INS 114 may operate as fast as possible (4 Hz and 500 Hz, respectively) to provide one absolute position measurement and many relative position measurements per frame. These position measurements can be interpolated to provide an estimate of each imager's position for each line in the imagery.

The ground server 140 uses data from the GPS receiver 112 and INS 114 to remove motion artifacts in the imagery captured by the camera array 120. The motion artifacts are caused by movement of the UAV 110, which may drift even if commanded to hover in one place. In addition, vibration from the UAV rotors induces small motion blur effects in the captured imagery. Dampeners on the mounting screws or other shock absorbers reduce the vibration but may not entirely suppress vibration effects. Fortunately, the GPS receiver 112 and INS 114 are sensitive enough to measure the vibration and drifting motion of the UAV 110. Together, the GPS receiver 112 and INS 114 capture the orientation (e.g. roll, pitch, yaw, and/or quaternion), position (ECEF, NED, or LLH), angular rates, acceleration, and time (UTC and GPS) at 500 measurements per second. The GPS/INS data and DragonFly imagery are synchronized with each other and transmitted to the ground processing server 130 which processes the data as explained below.

The processor 122 formats the raw imagery 121, GPS data, and INS data and transmits it to the remote server 140 via a fiber-optic cable running the length of the tether 130. More specifically, the processor 122 may be coupled to an optical transceiver (not shown) that transduces raw imagery 121, GPS data, and INS data into one or more optical signals. The optical transceiver launches these optical signals into the fiber-optic cable, which guides them to a corresponding optical transceiver (not shown) at the remote server 140. The remote server 140 can also send commands and queries to the processor 122 via the same communications channel, e.g., for steering the drone or controlling acquisition of the raw imagery 121 and other data.

One or more graphics processing units (GPUs) 142 in the remote server 140 process and store the raw imagery 121 collected by the camera array 120 in an archive/database 148. More specifically, the GPU 142 color corrects, white balances, and demosaics the raw imagery (141) using color correction information, such as reference imagery, stored in a color correction database 144a. The processed images can be encoded in the YUV420 color space instead of the RGB color space because the YUV420 color space occupies 1.5 channels compared to 3 channels for the RGB color space. It can also register the images from the different cameras 126 in the camera array 120 with respect to each other. (For more details on color correction, white balancing, demosaicing, and registration, see U.S. Pat. Nos. 9,007,432 B2 and 9,036,001 B2, each of which is incorporated by reference herein in its entirety.)

The color correction information can be derived in a camera calibration process performed before the system 100 is deployed. In this camera calibration process, the camera array 120 collects multiple outdoor datasets for processing. It also collects data from a diffractive optical element (DOE) setup. The DOE setup projects an array of point sources, where the point sources are separated from each other at specific angles. This DOE dataset is used to calculate the distortion coefficients separately from the outdoor datasets. Using the DOE speeds up camera calibration by decreasing the number of camera parameters that need to be optimized. The camera calibration parameters include focal length, pixel pitch, principle point, rotation (yaw, pitch, and roll), and distortion (e.g., four radial terms, two tangential terms).

The GPU 142 compresses the color-corrected, white-balanced, and demosaiced imagery (143), e.g., using the JPEG 2000 image compression method or another suitable method, and stores the compressed imagery in the archive 148. The compressed data is stored with the frame metadata (e.g., timestamps) in a custom data file format. For compression (143), an application programming interface (API) uses the GPU 142 to compress the imagery. The GPU 142 also stores the GPS and INS data in the archive/database 148 for later processing.

The user 11 can view the imagery collected by the camera array 110 and processed by the ground server 120 in real-time or in a playback mode using a display or viewer provided by the interactive exploitation tool 150. In either case, the interactive exploitation tool 150 and GPU 142 enable the user 11 to identify and track moving objects, such as people and vehicles, appearing in the motion images collected by the camera array 110. For example, the user 11 may see an object, either live or in recorded images, and tag that object for tracking (e.g., by drawing a box around the object in a still or video image with a cursor or touchscreen). The GPU 142 can also detect (146) stationary and moving objects automatically (132), for example, by recognizing learned objects using a properly trained neural network or comparing changes between successive frames to detect motion. In response to these detections, the ground server 140 server may send alerts to people (e.g., via their smartphones) and/or alert other systems, such as an automatically or manually controlled pan-tilt-zoom (PTZ) camera or small UAV, for investigating. It can also track (147) automatically detected moving objects and moving objects identified by the user 11 in live and recorded imagery and display those objects to the user 11 via the interactive exploitation tool 150, for example, in close-ups or zoom views on the interactive exploitation tool's display.

The GPU 142 also georectifies (145) and stabilizes (149) the color-corrected and demosaiced motion images using the absolute position data collected by the GPS 112 and the relative orientation/position data collected by the INS 114. (Image stabilization is discussed in greater detail below with respect to FIG. 5.) The GPU 142 can georectify the motion images in real-time for a live display to the user 11 via the interactive exploitation tool 150. To georectify a motion image, the GPU 142 adjusts the motion image to a known coordinate system, such as the GPS coordinate system or a relative coordinate system centered on the camera array, the UAV, or the user's position. The GPU 142 may perform this adjustment or coordinate transformation by warping the motion image into an appropriate map projection.

If the ground server 140 stores motion images that have not been georectified, it can georectify them on demand. For instance, if the user 11 requests previously recorded motion images for viewing or analysis, the GPU 142 can georectify and stabilize the recorded motion images (152) using the absolute and relative position data stored in the archive/database 148. The GPU 142 may use timestamps or other identifiers to match the stored motion images to the stored absolute and relative position data. Alternatively, the GPU 142 can georectify and stabilize the motion images before they are stored in the archive/database 148. Georectifying and stabilizing the motion images when retrieving the motion images may reduce the processing load on the GPU 142, whereas georectifying and stabilizing the motion images before storing them may reduce the time taken to respond to the user's request for the recorded images.

The tethered UAV 110 in FIG. 1A is designed to be deployed and remain fixed at a certain desired altitude (e.g., 100 ft, 200 ft, 300 ft, or 400 ft). However, gusts of wind or motion from the rotors themselves may cause the UAV 110 to tip, tilt, and/or rotate in an unplanned and possibly undesired fashion as shown in FIG. 1C. If the camera array 120 is not mounted on a gimbal, this causes each camera's field of view 123 to tip, tilt, or rotate (e.g., tipping from 123 to 123' in FIG. 1C) as well. The tip, tilt, and rotation may be limited by the UAV 110; for example, the UAV 110 may be able to tip and tilt by up to 15° and rotate by ±360° as limited by the tether 130. If this undesired motion occurs during imaging, it can distort the motion images captured by the camera 120.

To compensate for undesired motion of the camera array 120, the GPU 142 executes an image stabilization process (149 in FIG. 1B) that renders the imagery in a fixed orientation with apparent platform movement removed. The stabilized imagery can used for detecting and tracking (moving) objects in the imagery. Each imager 126 in the camera array 120 has a known set of intrinsic and extrinsic camera parameters which is formed into a camera matrix. The extrinsic parameters include orientation and position of that imager 126 relative to "imager 0," which is a predetermined imager 126 in the camera array 120. For simplicity, the imager 126 pointing straight down may be selected as camera 0 because its orientation is very straightforward; its yaw, pitch, and roll are 0°, 90°, and 0°, respectively. The GPU 142 uses the GPS and/or INS measurements to compute an additional translation and rotation matrix that represents the UAV motion. If the UAV 110 and camera array 120 are rigidly connected with each other, the GPU 142 combines this additional translation and rotation matrix with each imager's camera matrix.

Once the images have stabilized, they can be rendered, e.g., for display to the user 11 via the interactive exploitation tool 150. Image rendering is a process where each pixel in the image is transformed from image space to world space via a transform matrix. Rendering occurs in the interactive exploitation tool 150, which uses the GPU 142 to help render the image. The interactive exploitation tool 150 may incorporate the compute unified device architecture (CUDA) platform, which is the API that NVIDIA GPUs use. Rendering can also be used when running detection and tracking. The interactive exploitation tool 150 and/or GPU 142 render the image to an image buffer and then send that buffer through image processing.

The camera array's field of view includes 20 degrees above the horizon, which is the maximum expected tilt of the UAV 110 and the camera array 120. This ensures that the ground should always be in the field of view of the camera array 120.

Camera Arrays and Cameras

Figure 2A:
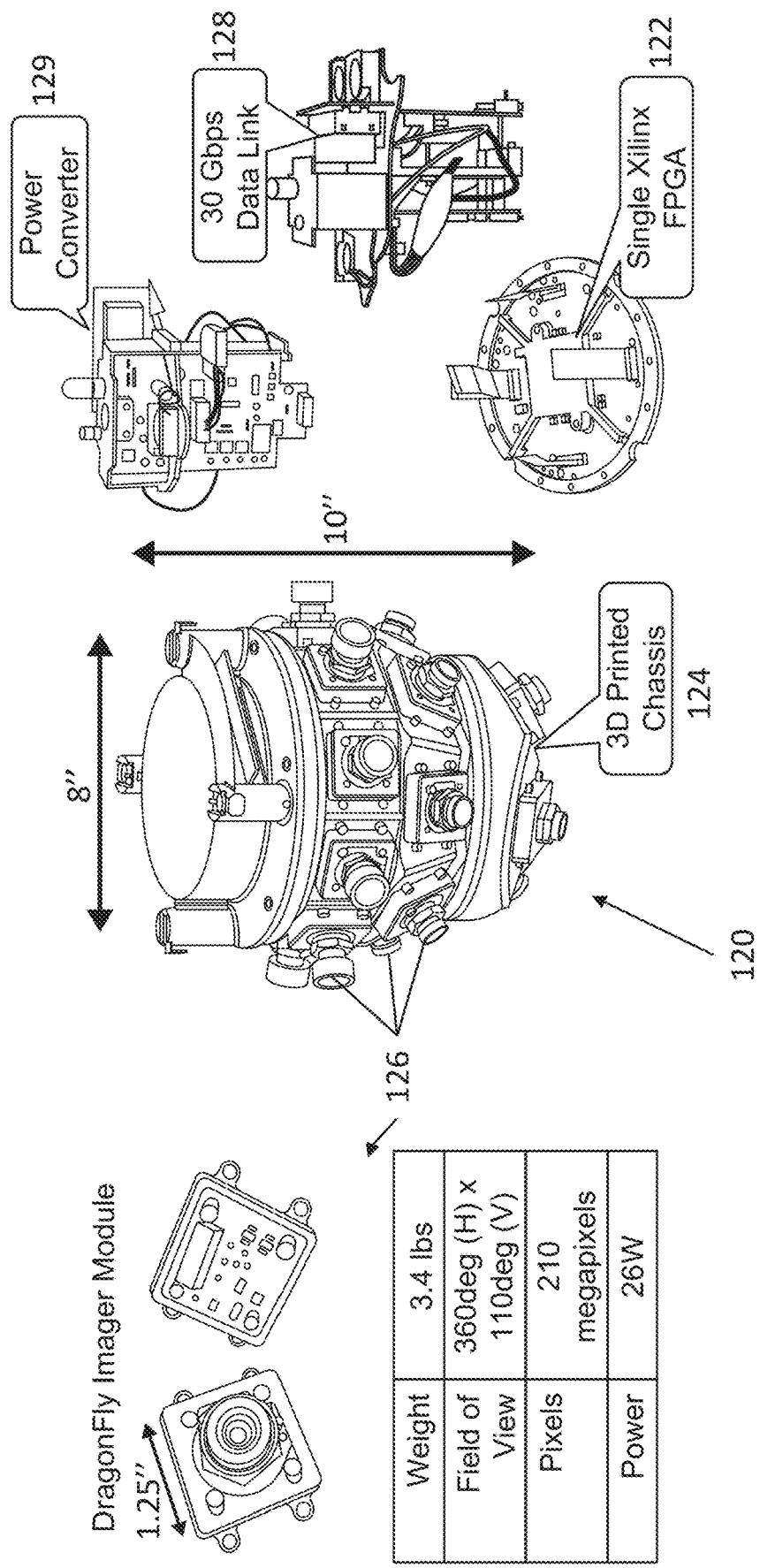
FIG. 2A shows the camera array of the wide-area imaging system of FIG. 1A in greater detail.
Figure 2B:
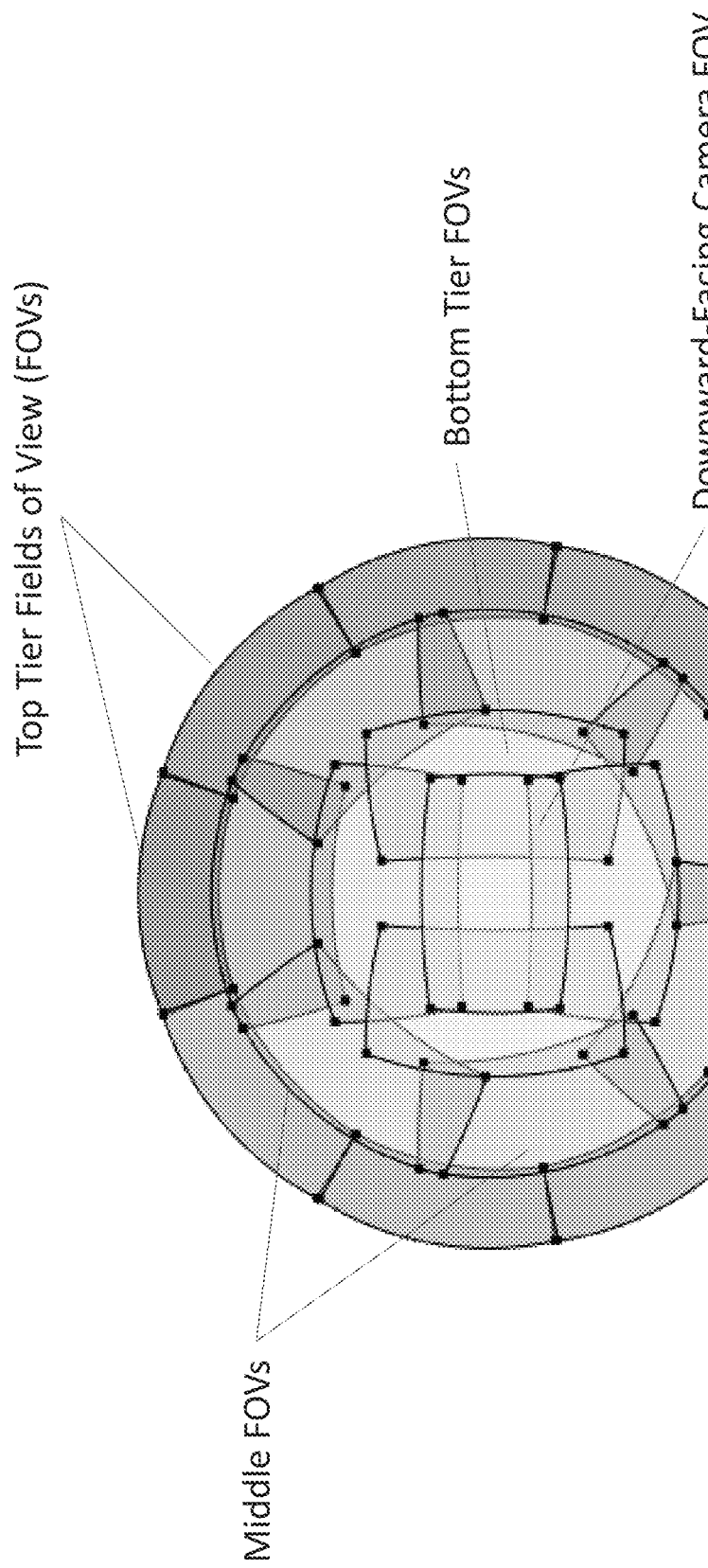
FIG. 2B shows the overlapping fields of view of the cameras in the camera array of FIG. 2A.

FIG. 2A shows the camera array 120 in greater detail. It weighs about 3.5 lbs. and is roughly 10 inches high with a diameter that decreases from a maximum of about 8 inches at the top. The camera array 120 includes three different rows, or tiers, of cameras or imagers 126, mounted on a three-dimensional (3D) printed chassis 124 made of metal, plastic, or any other suitable material. The top tier includes nine cameras 126, the middle tier includes seven cameras 126, and the bottom tier includes five cameras 126 (including one camera that points straight down), for a total of twenty-one cameras 126. Other numbers of cameras and/or tiers are also possible These imagers 126 have overlapping fields of view, shown in FIG. 2B, that together span 360° horizontally and 110° vertically. In particular, the vertical fields of view for the cameras 126 in the top, middle, and bottom tiers are 24°, 35°, and 43°, respectively. The overlap between the vertical fields of view of the imagers 126 in the top and middle tiers is 3°. The overlap between the vertical fields of view of the imagers 126 in the middle and bottom tiers is 5°, not counting the downward-pointing camera 126. The overlap between the fields of view of the downward-pointing camera and the other cameras in the bottom tier is 5°. Other fields of view and overlaps are also possible.

As noted above, the UAV 110 has a maximum tilt of 15°. Laying out the imagers 126 to provide an additional 20° (90°+20°=110°) of coverage provides complete coverage of the ground, even when the UAV 110 is tilted. (Other numbers and arrangements of cameras 126 and other fields of view are also possible.) The camera 126 may all be of the same modality—e.g., they may all be visible image sensors as in FIGS. 2C and 2D, bolometers, or near-infrared image sensors—and they can have the same or different resolutions (numbers of sensing elements). In FIG. 2A, the cameras 126 are visible, 10.5-megapixel image sensors that operate at an acquisition rate of 7.5 frames per second. The cameras 126 are mounted in or on the chassis 124 such that adjacent cameras 126 have overlapping fields of view to provide complete coverage of the area above or below the UAV 110.

Optional polyurethane covers 127, shown in FIGS. 2C and 2D, protect the cameras 126 from dust and debris kicked up by the UAV rotors. These covers 127 completely cover and seal the imagers' external openings. This prevents water and dust from getting inside the imager and camera head. The covers 127 can be attached to the cameras 126 with a light adhesive.

The chassis 124 also contains electronics that power and control the imagers 126. These electronics include a processor 122 (e.g., a field-programmable gate array), one or more optical transceivers 128 (e.g., a Quad Small Form-factor Pluggable (QSFP+) transceiver that operates at 40 Gbps), and a power converter 129. The processor 122 controls the imagers 126, performs limited processing of the imagery collected by the imagers 126, and responds to queries and commands from the ground server 140. The optical transceiver 128 transmits data to and receives commands and queries from the ground server 140 via a fiber-optic cable in the tether 130. More specifically, the processor 122 formats the raw image, GPS, and INS data, and the optical transceiver 128 transduces the formatted data into optical signals that it launches into the fiber-optic cable. The optical transceiver 128 also transduces optical signals from the ground server 140 into digital electronic signals for the processor 122.

Compared to an IIS camera array, an inventive camera array 120 has fewer imagers 126 but more pixels per imager, providing more pixels overall and finer resolution. The imager lenses may all the be the same (e.g., M12 lenses), simplifying lens alignment and lens distortion compensation. The camera array 120 has a smaller diameter, so the chassis 124 is correspondingly smaller and lighter. Its processor 122 can be implemented as a single FPGA instead of 16 FPGAs, with a corresponding reduction in the number of data lines (a single optical fiber line instead of 16 optical fiber lines).

As noted above, the optical transceiver 129 can be implemented as a QSFP+ that can operate at data rates up to 40 Gbps. The QFSP+'s output is coupled into the first port of an optical circulator whose second port is coupled to the fiber optic cable and whose third port is coupled to the QFSP+'s input. A transceiver in the ground server 140 can be coupled to the fiber-optic cable with another optical circulator in a similar arrangement. Using the optical circulators enables the ability to transmit and receive data using a single, bidirectional fiber-optic cable whereas typical systems use at least two unidirectional fiber-optic cables.

QSFP+s can transmit and receive data optically on four different carrier wavelengths (e.g., 1330 nm, 1310 nm, 1290 nm, and 1270 nm, which are the coarse wavelength division multiplexing (CWDM) bands), with signals at each carrier wavelength modulated at rates up to 10 Gbps for a total signal bandwidth of 40 Gbps. The transceiver 128 in FIG. 2A uses three carrier wavelengths (e.g., 1270 nm, 1290 nm, and 1310 nm), where each carrier wavelength is used to transmit imagery from seven out of the 21 imagers 126 as well as the GPS/INS data. Optical multiplexers and demultiplexers (mux/demux) can also be used to separate the different wavelengths for data ingestion and processing. The ground server 140 uses a CWDM demultiplexer to split the data from the camera array 120 into three channels, each at a different carrier wavelength. The ground server 140 has three SFP+ transceivers coupled to the CWDM demultiplexer to receive the data, with each SFP+ transceiver operating at a different carrier wavelength and receiving data for a different group of seven imagers 126.

The power converter 129 receives electrical power from the generator 102 or another power source via a twisted pair of copper wires entwined with the fiber-optic cable in the tether 130. If the electrical power is alternating current (AC), the power converter 129 transforms it into direct current (DC) power at the appropriate voltage and current levels for driving the imagers 126, processor 122, optical transceiver 128, and other components in the camera array 120 and/or the UAV 110. If the electrical power is DC electrical power, the power converter 129 may step the voltage up or down as appropriate. In operation, the camera array 120 may consume about 15 W to about 40 W (e.g., about 19 W).

Figure 3A:
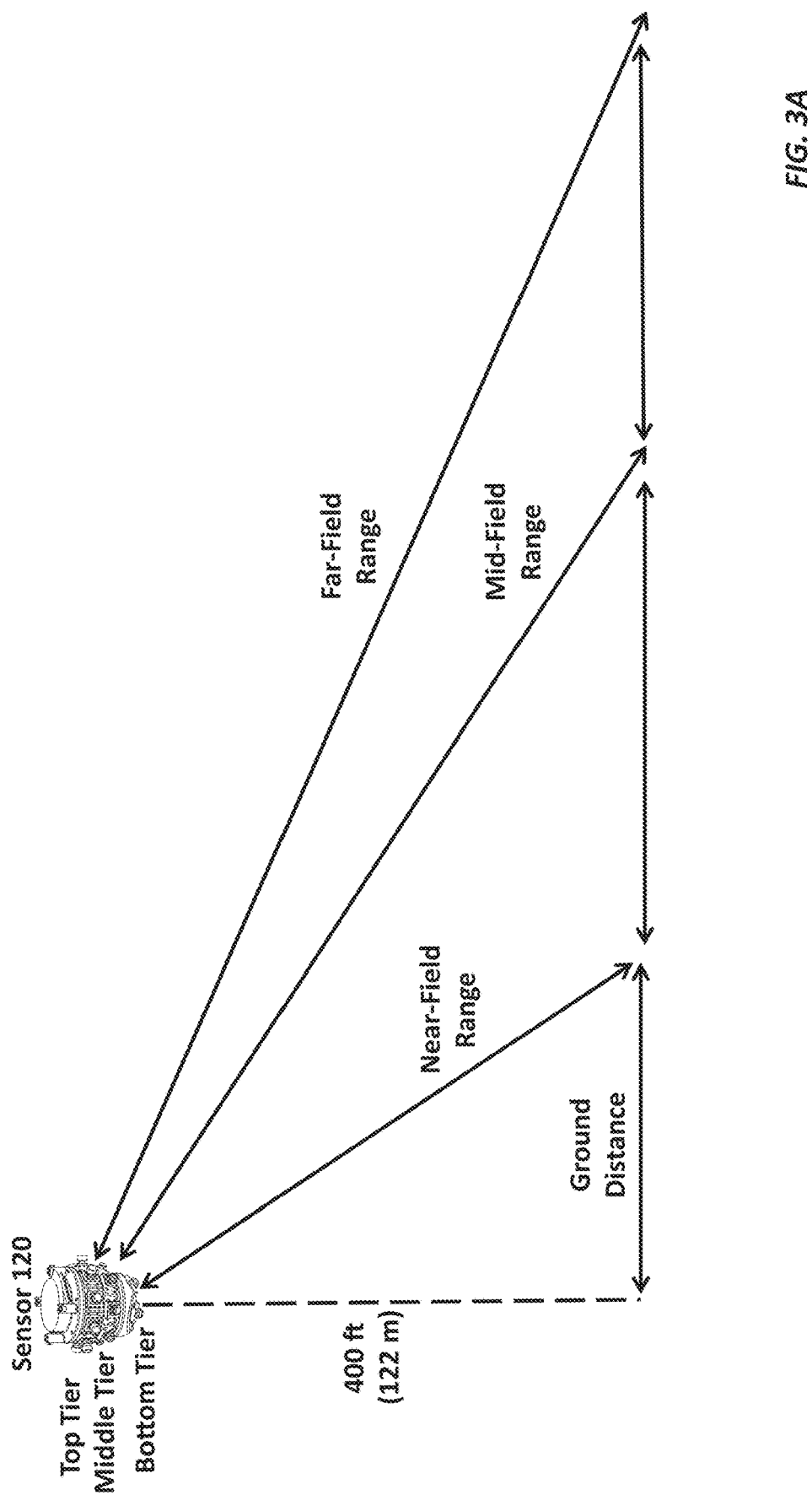
FIG. 3A illustrates ranges for the different tiers in the camera array of FIG. 2A.

FIGS. 3A-3D illustrate selection of the focal lengths for the lenses of the cameras 126. As shown in FIG. 3A, the cameras 126 in the different tiers of the camera array 120 point at the ground at different angles and therefore have different ranges to the portions of the scene that they image. The top tier has the longest, or far-field range; the bottom tier has the shortest, or near-field range; and the middle tier has an intermediate, or mid-field range. The camera focal lengths are fixed focal lengths selected to provide a desired spatial resolution across the entire area imaged by the camera array 120 even though the different tiers of cameras 126 operate at different ranges.

These focal lengths can be calculated from the instantaneous fields of view (IFOVs) and pixel sizes for the cameras 126. Generally, the IFOV for a camera 126 is related to the camera's range and desired spatial resolution:

$$IFOV = 2\tan^{-1}\left(\frac{\text{Resolution}}{2 \times \text{Range}}\right),$$

where the Range is as shown in FIG. 3A. (FIG. 3A also shows the ground distance as plotted in FIGS. 3B-3D.) A camera's focal length is given by the ratio of the camera's pixel size to its IFOV:

$$\text{Focal Length} = \frac{\text{Pixel Size}}{IFOV}.$$

Substituting for the IFOV gives the following expression for the focal length:

$$\text{Focal Length} = \frac{\text{Pixel Size}}{2\tan^{-1}\left(\frac{\text{Resolution}}{2 \times \text{Range}}\right)}.$$

Figure 3B:
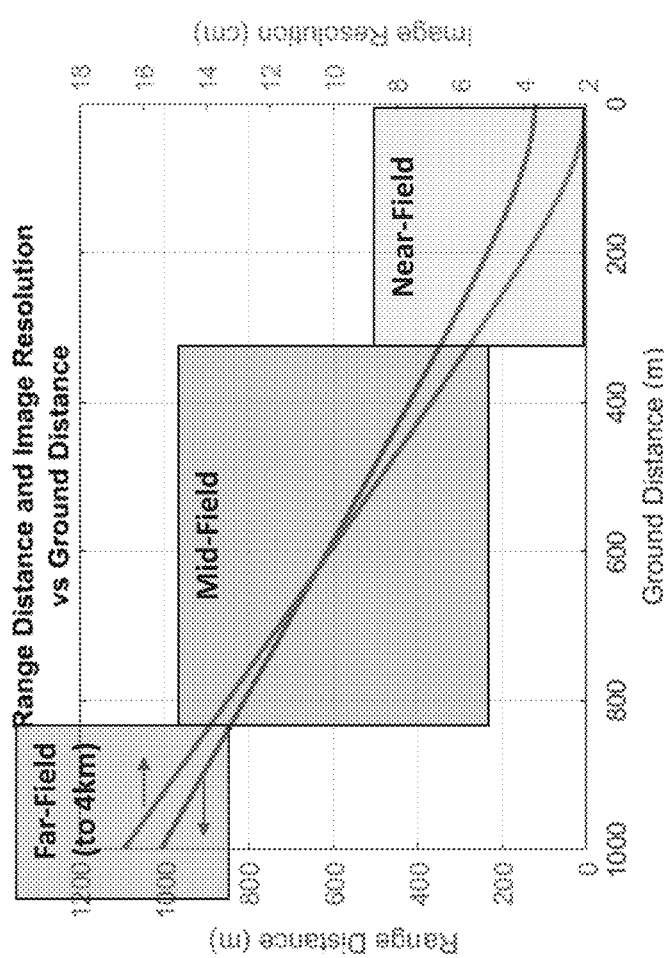
FIG. 3B illustrates the image resolution and range distance as ground distance increases.

FIG. 3B is a plot of the range (left axis) and image resolution (right axis) versus ground distance. It shows the actual Range values (left axis) as a function of the Ground Distance at a sensor height of 400' based on simple geometry. It also shows the image resolution (right axis) as a function of range, which is a function of ground distance, for a desired IFOV of 165 μrad. This IFOV is based on a desired resolution of 33 cm/pixel at a range of 2 km. For these values, the image resolution at the lower ground distances is finer than the desired 33 cm/pixel resolution. FIG. 3B shows that selecting lenses that provide a spatial resolution of 33 cm/pixel at a range of 2 km results in a resolution below the sensor (i.e., at a ground distance of 0) of 4 cm/pixel or better.

Figure 3C:
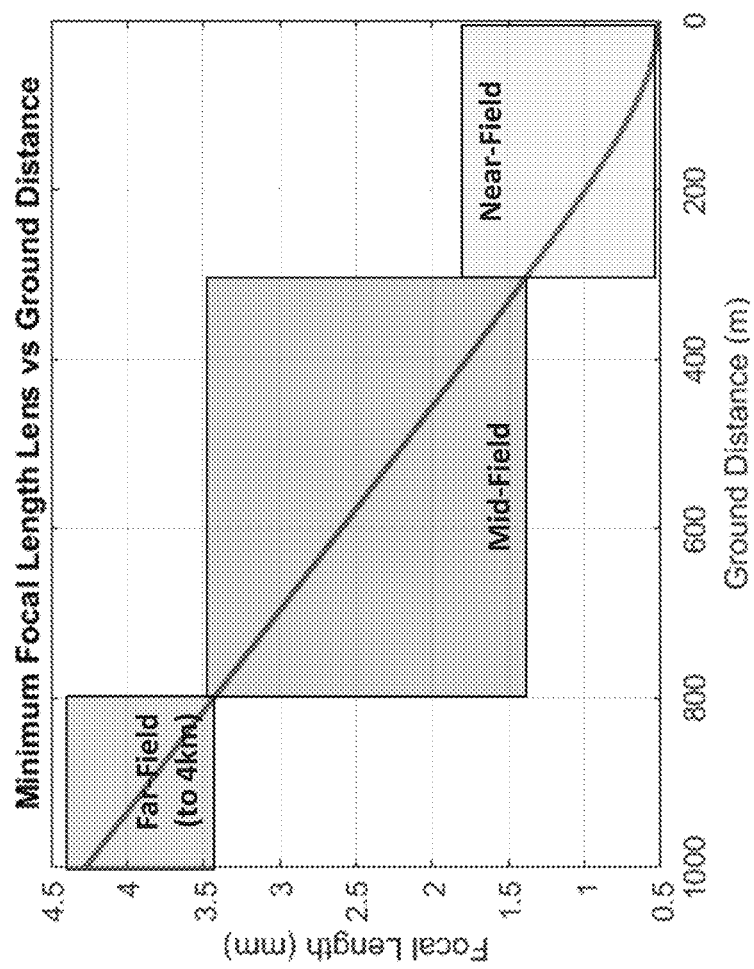
FIG. 3C is a plot of imager focal length versus ground distance for a desired spatial resolution of the imagery acquired by the camera array of FIG. 2A.

FIG. 3C is a plot of the minimum focal length versus ground distance (as shown in FIG. 3A) for a spatial resolution of 33 cm/pixel at the given ground distance. For this spatial resolution, the minimum (fixed) focal lengths are 1.5 mm, 3.5 mm, and 7.5 mm for the cameras 126 in the bottom, middle, and top tiers, respectively. Using the formula for focal length given resolution and range, it is possible to compute the minimum focal length for providing 33 cm/pixel resolution as a function of ground distance.

Figure 3D:
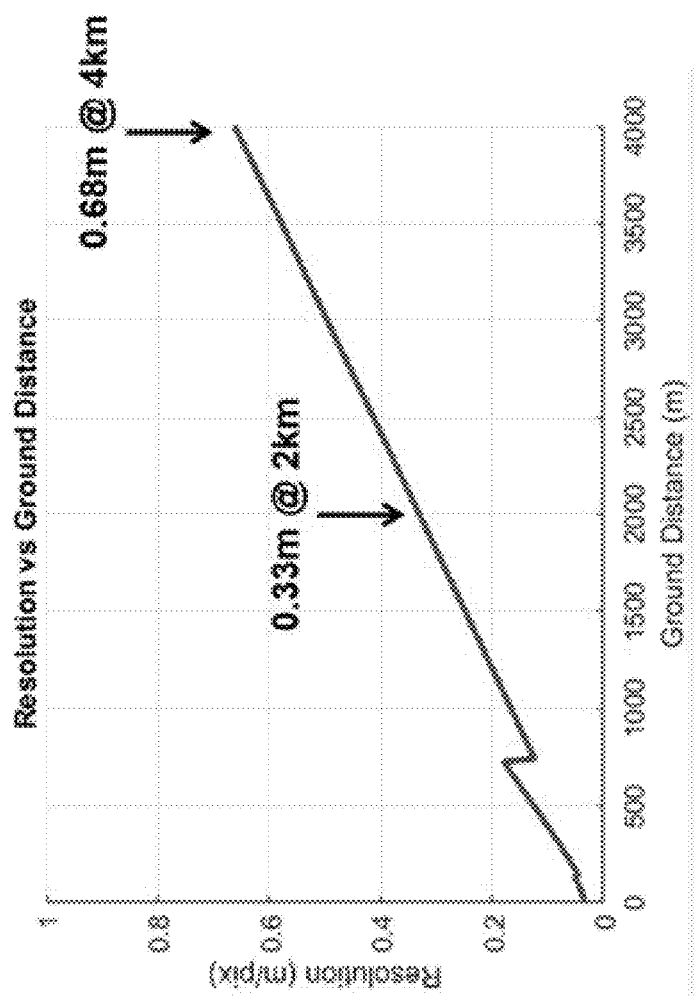
FIG. 3D is a plot of spatial resolution versus ground distance for a three-tier camera array with fixed focal lengths of 4.35 mm (bottom tier), 5.4 mm (middle tier), and 8.25 mm (top tier).

FIG. 3D shows the spatial resolution versus ground distance for the camera array 120 at a height above the ground of 400 feet and cameras 126 with fixed focal lengths of 4.35 mm (bottom tier), 5.4 mm (middle tier), and 8.25 mm (top tier). At a ground distance of 2 km, the spatial resolution is 33 cm per pixel. This spatial resolution increases to 68 cm per pixel at a ground distance of 4 km.

Figure 4:
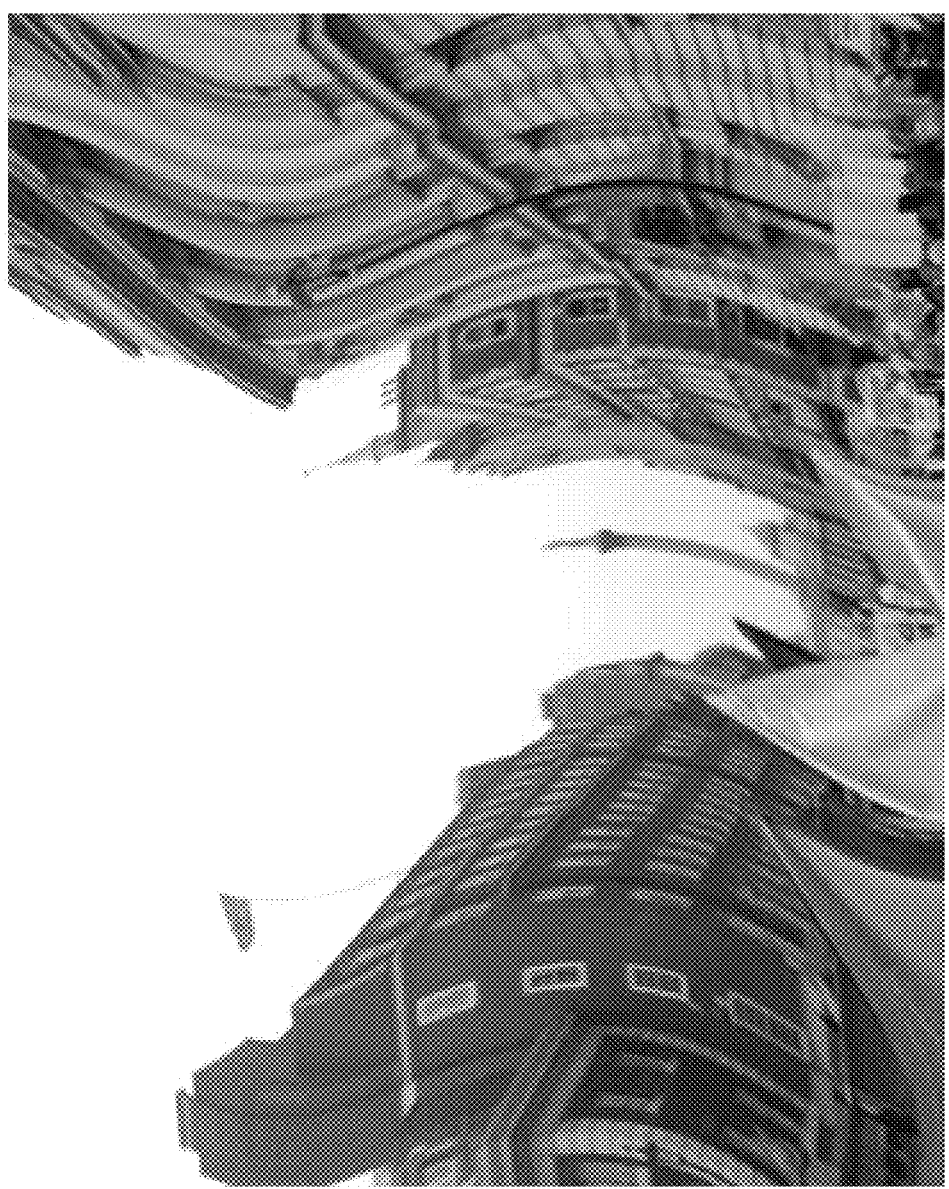
FIG. 4 shows a "rolling shutter" image.

The fixed focal length lens in each camera 126 forms an image on a sensor array, such as a complementary metal-oxide-semiconductor (CMOS) sensor array. CMOS sensor arrays with rolling shutters are particularly well suited for use in the cameras 126 because their small pixel pitches match well with shorter focal length lenses. Rolling shutter is an image capture method where the rows of pixels in an image sensor are read out one at a time instead of all at once. This yields an image whose rows are captured at different times. If the sensor array moves with respect to the scene (e.g., because it is on a moving UAV) during the image capture, the captured imagery may be distorted. This distortion may include wobble (typically caused by vibration of the sensor array), skew, spatial aliasing, or temporal aliasing. FIG. 4 shows a rolling-shutter image distorted by wobble caused by vibration of the sensor array that acquired the image.

Camera Calibration

The imagers 126 can be calibrated as follows. Each imager 126 has its own set of intrinsic and extrinsic camera parameters. The intrinsic parameters include pixel pitch, lens focal length, and principle point. The extrinsic parameters include three Euler angles (e.g., yaw, pitch, and roll) and three position values (e.g., x, y, are z). These angles and positions are relative to the physical center of the camera array 120. To simplify the calculations, the position values can be taken to be 0 for every imager 126 in the camera array 120. The simplification is acceptable because the distance from the camera array 126 to the scene is so large compared to the distance between the imagers 126 and the center of the camera array. Making this simplification eliminates three parameters to refine during image registration. This leaves 13 parameters that are refined by the image registration process: x focal length, y focal length, x principle point, y principle point, roll, pitch, yaw, radial distortion (four terms), and tangential distortion (two terms). The initial parameters are determined by the specifications of the CMOS imager, the lens, and the layout of the camera array 126. The image registration process refines these estimates by using calibration setups or using outdoor scenes, e.g., as described with respect to FIG. 6B in U.S. Pat. No. 9,007,432 B2.

For example, in DragonFly, the near-field tier of CMOS imagers have a 1.4 µm pixel pitch, a focal length of 4.35 mm, and a principle point that is assumed to be the center of the focal plane, which is 10.5 MP array of 4320×2432 pixels. The intrinsic camera parameters can be represented as a matrix, K, which performs a transformation from the pixel coordinate system to the camera coordinate system:

$$K = \begin{bmatrix} fl_x/ps & 0 & -p_x \\ 0 & fl_y/ps & -p_y \\ 0 & 0 & 1 \end{bmatrix} \rightarrow \begin{bmatrix} 3107.14 & 0 & -2160 \\ 0 & 3107.14 & -1216 \\ 0 & 0 & 1 \end{bmatrix}$$

where $fl_x$ and $fl_y$ are the x and y focal lengths, ps is the pixel pitch, and $p_x$ and $p_y$ are the x and y coordinates of the principle point.

The external camera matrix is formed from the three Euler angles into a single Direction Cosine Matrix (DCM). It can be written as an external rotation matrix $R_s^{imgN}$ that rotates a point from the $N^{th}$ imager's camera coordinates (imgN) to sensor coordinates (s) as follows:

$$R_s^{imgN} = \begin{bmatrix} \cos\psi & \sin\psi & 0 \\ -\sin\psi & \cos\psi & 0 \\ 0 & 0 & 1 \end{bmatrix} \times \begin{bmatrix} \cos\theta & 0 & -\sin\theta \\ 0 & 1 & 0 \\ \sin\theta & 0 & \cos\theta \end{bmatrix} \times \begin{bmatrix} 1 & 0 & 0 \\ 0 & \cos\varphi & \sin\varphi \\ 0 & -\sin\varphi & \cos\varphi \end{bmatrix}$$

where φ, θ, ψ represent the yaw, pitch, and roll, respectively.

For example, consider the second (N=2) imager, which is a near-field imager whose yaw, pitch, and roll values are −90°, 58°, and 90°, respectively. The second imager's rotation matrix becomes:

$$R_s^{img2} = \begin{bmatrix} \cos 90 & \sin 90 & 0 \\ -\sin 90 & \cos 90 & 0 \\ 0 & 0 & 1 \end{bmatrix} \times \begin{bmatrix} \cos 58 & 0 & -\sin 58 \\ 0 & 1 & 0 \\ \sin 58 & 0 & \cos 58 \end{bmatrix} \times$$

$$\begin{bmatrix} 1 & 0 & 0 \\ 0 & \cos -90 & \sin -90 \\ 0 & -\sin -90 & \cos -90 \end{bmatrix}$$

$$R_s^{img2} = \begin{bmatrix} 0 & 0 & -1 \\ -0.530 & 0.848 & -0.380 \\ 0.848 & 0.530 & -0.237 \end{bmatrix}$$

In this example, the elements of the rotation matrix are shown to three significant digits, but other degrees of precision may be used (for example, about ten significant digits with double-precision floating point values).

Each imager's transformation matrix transforms images from the local pixel coordinate system to a common coordinate system. This common coordinate system could be the sensor coordinate system, the camera coordinate system of a specific imager (e.g., imager 0), or the relative coordinate system of the IMU/INS 114. For example, if the common coordinate system is the camera system of imager 0, the transformation matrix for imager 2 is derived by multiplying the various matrices together as follows:

$$[XYZ] = [xy1] \times K \times R_s^{img2} \times (R_s^{img2})^T$$

where x, y are in imager 2's pixel coordinate system and X, Y and Z are in imager 0's camera coordinate system.

Rolling Shutter Correction and Georectification

To correct for this rolling shutter effect, the GPU 142 (FIG. 1B) uses the INS measurements to interpolate an estimated translation for each row of pixels in each image from each camera 126. The GPU 142 transforms the pixels to negate this movement measured by the INS 114. More specifically, the GPU 142 linearly interpolates the INS measurements. This linear interpolation may not correct for impulsive jitter or motion, that is, jitter or motion that lasts for less than the frame period (e.g., less than 2 ms). The GPU 142 does not check the amount of motion; instead, it processes every frame, whether or not the camera array moved impulsively.

The DragonFly system records images at a given frame rate (e.g., 7.5 fps), with each imager recording two timestamps per frame: a first timestamp that marks the beginning of the frame and a second timestamp that marks the end of the frame. The timestamps may slightly vary from imager to imager. The INS's estimation filter records position and orientation at higher rates, e.g., 500 Hz. Each packet of INS data is timestamped using the same clock that generates timestamps for the frames. The INS position data can be reported in terms of North, East, Down (NED) or Latitude, Longitude, Height (LLH). Orientation data can be reported in Euler angles or quaternions relative to magnetic North or some other reference orientation.

The image timestamps and INS data are synchronized before correcting rolling shutter effects or georectifying the frames. First, the imager timestamps are scanned to determine the earliest and latest timestamps. Then, the INS timestamps are converted to a line or row index by taking the difference between the current timestamp and the timestamp marking the beginning of the frame and dividing by the line rate. Typically, the INS 114 makes 5-15 measurements per frame. These INS measurements are then linearly interpolated using a linear least squares solution to provide an estimated INS position and orientation for each line or row in the frame. The estimated INS position and orientation can be formed into 3×4 transformation matrix. For example, given a position (x, y, z) and quaternion (a, b, c, d), the transformation matrix is:

$$sensor2World = [R\ T]$$

$$R = \begin{bmatrix} a^2 + b^2 - c^2 - d^2 & 2(bc + ad) & 2(bd - ac) \\ 2(bc - ad) & a^2 - b^2 + c^2 - d^2 & 2(cd + ab) \\ 2(bd + ac) & 2(cd - ab) & a^2 - b^2 - c^2 + d^2 \end{bmatrix},$$

$$T = R \times \begin{bmatrix} -x \\ -y \\ -z \end{bmatrix}$$

This transformation matrix can be applied to each row of pixels in the corresponding frame during the rendering process to correct for the rolling shutter effect and to georectify the image. Alternatively, the matrix can be inverted if the rendering process uses a reverse mapping approach. If a different coordinate system is desired, an additional transformation matrix can be multiplied to the transformation matrix described immediately above.

Figure 5:
FIG. 5 shows images acquired by the camera array of FIG. 2A.

FIG. 5 shows images captured and processed with a wide-area imaging system like the one shown in FIGS. 1A-1C. The wide-area imaging system's UAV was hovering at a height of about 400 feet above a small compound in forested countryside, with roads leading into and out of the compound. The camera array that acquired the images had top, middle, and bottom tiers of cameras with fixed focal lengths of 4.35 mm, 5.4 mm, and 8.25 mm, respectively. The ground server stitches together overlapping images to produce a wide-area image showing the entire area below the UAV as well as seamless closeups of any region within that area. These closeups show that vehicles can be resolved at distances of 250 m, 500 m, and even 1.5 km.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A system for wide-area motion imaging, the system comprising:
   an unmanned aerial vehicle (UAV);
   a camera array, attached to the UAV, to acquire motion images of an area around the UAV, the camera array including a first row of cameras and a second row of cameras, each camera in the first row of cameras having a first fixed focal length and each camera in the second row of cameras having a second fixed focal length different than the first fixed focal length;
   a processor, operably coupled to the camera array, to receive and format the motion images and to transmit formatted motion images; and
   a remote server, communicatively coupled to the processor, to receive, store, and process the formatted motion images.

2. The system of claim 1, wherein the UAV has a center of mass aligned with a center of mass of the camera array along a vertical centerline of the UAV.

3. The system of claim 1, wherein the camera array is configured to acquire the motion images over a 360° horizontal field of view.

4. The system of claim 1, wherein:
   the first row of cameras is configured to acquire a first portion of the motion images at a first spatial resolution; and
   the second row of cameras is configured to acquire a second portion of the motion images at substantially the first spatial resolution.

5. The system of claim 1, wherein the remote server is communicatively coupled to the processor via a tether connected to the UAV.

6. The system of claim 5, wherein the tether is configured to provide electrical power to the UAV, the camera array, and/or the processor.

7. The system of claim 5, further comprising:
   an optical transceiver, operably coupled to the processor, to transduce the formatted motion images into an optical signal, and
   wherein the tether comprises a fiber-optic link configured to convey the optical signal from the optical transceiver to the remote server.

8. The system of claim 1, wherein the remote server is configured to demosaic and color correct the formatted motion images.

9. The system of claim 1, wherein the remote server is configured to detect and/or track an object appearing in the formatted motion images.

10. The system of claim 1, wherein the remote server is configured to compress and store the formatted motion images in an archive.

11. The system of claim 10, wherein the remote server is configured to georectify the formatted motion images stored in the archive on demand based on at least one of Global Positioning System (GPS) data or inertial navigation system (INS) data.

12. The system of claim 1, further comprising:
   at least one of a Global Positioning System (GPS) receiver or an inertial navigation system (INS) and wherein the remote server is configured to georectify the formatted motion images based on data from the least one of the GPS receiver or the INS.

13. The system of claim 12, wherein the INS is at a geometric center of the camera array.

14. A method of wide-area motion imaging with a camera array attached to an unmanned aerial vehicle (UAV), operably coupled to a processor, and including a first row of cameras and a second row of cameras, each camera in the first row of cameras having a first fixed focal length and each camera in the second row of cameras having a second fixed focal length different than the first fixed focal length, the method comprising:
   acquiring a first portion of motion images of an area around the UAV with the first row of cameras in the camera array;
   acquiring a second portion of the motion images of the area around the UAV with the second row of cameras in the camera array;
   transmitting the motion images from the camera array to a remote server; and
   processing the motion images with the remote server.

15. The method of claim 14, wherein acquiring motion images comprises acquiring the motion images over a 360° horizontal field of view.

16. The method of claim 14, further comprising:
   acquiring Global Positioning System (GPS) data representing an absolute location of the camera array during acquisition of the motion images;
   acquiring inertial navigation system (INS) data representing a relative location and/or orientation of the camera array during acquisition of the motion images; and
   georectifying the motion images based on the GPS data and/or the INS data.

17. The method of claim 14, wherein:
   acquiring the first portion of the motion images is at a first spatial resolution; and
   acquiring the second portion of the motion images is at substantially the first spatial resolution.

18. A method of wide-area motion imaging with a camera array attached to an unmanned aerial vehicle (UAV) and operably coupled to a processor, the method comprising:
   acquiring motion images of an area around the UAV with the camera array;
   transmitting the motion images from the camera array to a remote server; and
   processing the motion images with the remote server, wherein transmitting the motion images from the camera array to the remote server comprises:
   transducing the motion images into an optical signal; and
   transmitting the optical signal from the camera array to the remote server via a fiber-optic link in a tether connected to the UAV.

19. The method of claim 14, further comprising:
   supplying electrical power to the UAV and/or the camera array via a tether connected to the UAV.

20. The method of claim 14, further comprising:
   demosaicing and color correcting the motion images.

21. The method of claim 14, further comprising:
   detecting and/or tracking an object appearing in the motion images.

22. The method of claim 14, further comprising:
   compressing and storing the motion images in an archive.

23. The method of claim 22, further comprising:
   georectifying the motion images stored in the archive on demand based on at least one of Global Positioning System (GPS) data or inertial navigation system (INS) data.

24. A system for wide-area motion imaging, the system comprising:

an unmanned aerial vehicle (UAV);
a camera array, attached to the UAV, to acquire motion images of an area around the UAV at a rate of about 5 frames per second (fps) to about 15 fps, the camera array comprising a first tier of cameras, each camera in the first tier having a first fixed focal length, and a second tier of cameras, each camera in the second tier having a second fixed focal length different than the first fixed focal length;
a global navigation satellite system (GNSS) receiver, attached to the UAV, to measure an absolute position of the camera array at rate of about 1 Hz to about 4 Hz;
an inertial measurement unit (IMU), attached to the UAV and disposed at a geometric center of the camera array, to measure a relative position of the camera array at a rate of about 1 Hz to about 500 Hz;
an optical transceiver, attached to the UAV and operably coupled to camera array, to transmit the motion images, the absolute position, and the relative position via a tether connected to the UAV, the optical transceiver configured to transmit the motion images from the first tier of cameras on a first optical carrier and to transmit the motion images from the second tier of cameras on a second optical carrier different from the first optical carrier; and
a remote server, coupled to the UAV via the tether, to receive, store, and process the motion images and to georectify the motion images based the absolute position and the relative position.

* * * * *